United States Patent

[11] 3,625,524

| [72] | Inventor | Melvin Vergales<br>Richmond, Va. |
|---|---|---|
| [21] | Appl. No. | 63,358 |
| [22] | Filed | Aug. 13, 1970 |
| [45] | Patented | Dec. 7, 1971 |
| [73] | Assignee | AMF Incorporated |

[54] ROTATABLE SEAL
8 Claims, 5 Drawing Figs.

[52] U.S. Cl. .................................................. 277/115
[51] Int. Cl. .................................................. F16j 15/34
[50] Field of Search .......................................... 277/81, 83, 102–116

[56] References Cited
UNITED STATES PATENTS

| 920,006 | 4/1909 | Badeker | 277/115 |
| 1,050,870 | 1/1913 | Stickley | 277/115 |
| 1,978,689 | 10/1934 | Peters | 277/81 |

*Primary Examiner*—Robert I. Smith
*Attorneys*—George W. Price and Donald P. Walker ABSTRACT: A sealing member constructed and arranged to be abutably mounted on a rotatable shaft which extends through an opening formed in a housing, and abutably mounted against the housing, to close the space between the housing and shaft. The sealing member has shaft and housing sealing surfaces and, spaced apart from both of them, a surface which is angularly related to the sealing surfaces. The latter surface is angled such that a force applied to it to abutably mount the shaft and housing seals in place, tends to cause the sealing member to rotate with the shaft. The aforesaid latter surface is spaced apart from the sealing faces so that the sealing member may be held in place by apparatus which is also spaced apart from the sealing faces, rather than by apparatus which encloses the sealing member in a cavity adjacent the space between the housing and shaft. As a consequence, the sealing member is constructed and arranged to allow fluid from within the housing which seeps past the sealing faces to freely flow away from the sealing member.

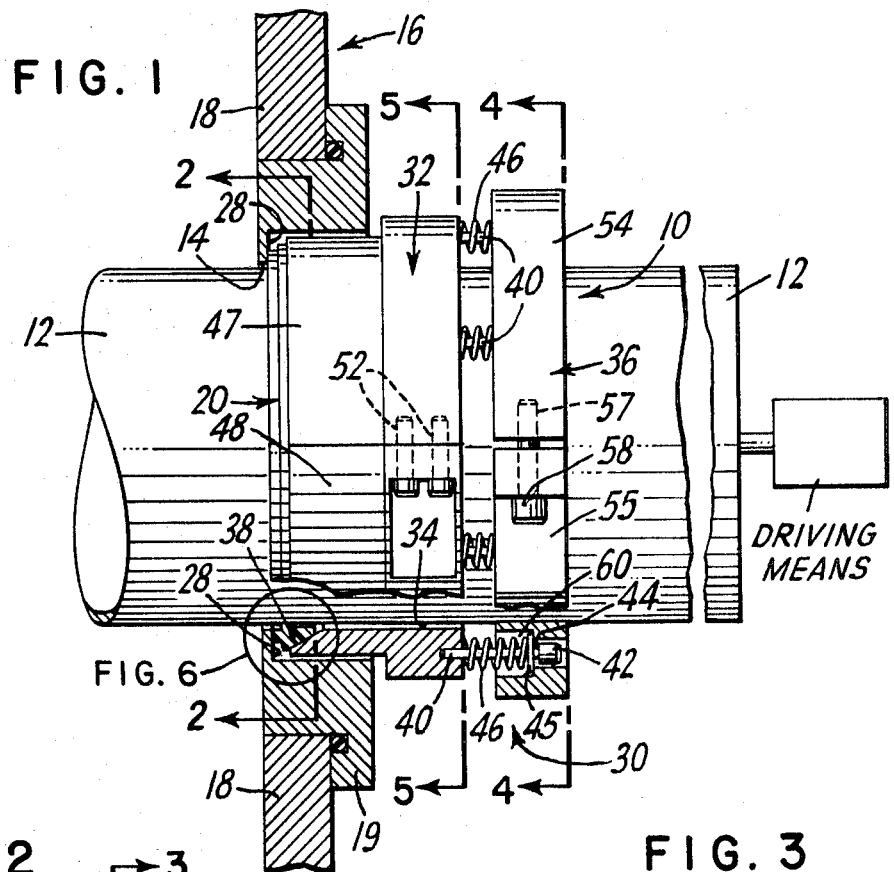
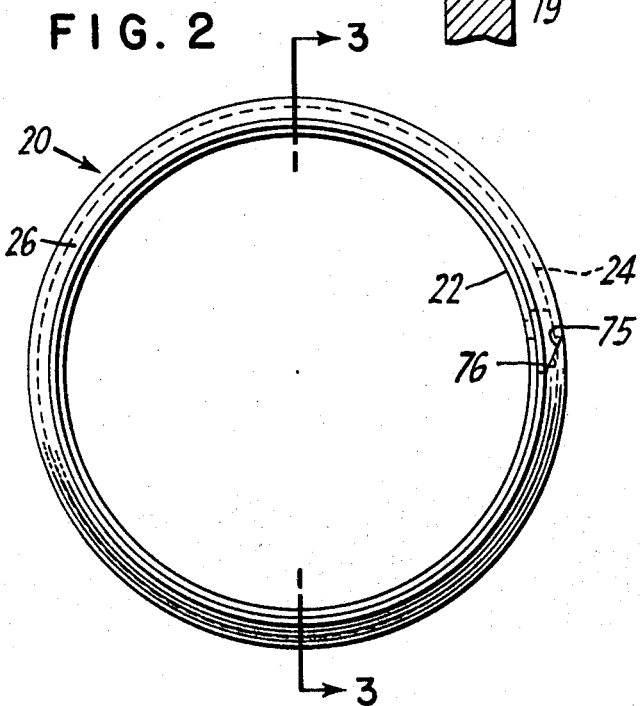

INVENTOR
MELVIN VERGALES
BY D. Walker
ATTORNEY

ROTATABLE SEAL

BACKGROUND AND SUMMARY OF THE INVENTION

Dough for bakery products is commercially prepared via the use of one or the other of two well-known processes, the "straight" dough process or the "sponge" process. The former is characterized by the initial step of mixing all of the ingredients which go into the final product together at once for fermentation, the fermented mass being referred to in the art as predough; and the latter process is characterized by a series of steps for making the predough, including mixing less than all of such ingredients together for fermentation and, after fermentation, adding to the resulting "sponge" the remainder of the ingredients to form the predough.

In either process the predough is then ready to undergo further processing. For example, in the event that the final product is to be bread, the predough would basically be subjected to the steps of developing, dividing, panning, proofing and baking to form the final product.

Although there are a variety of mixers commercially available for preparing predough on a batch-by-batch basis, one of the most commonly employed mixers includes a stationary housing wherein the ingredients are mixed by means of paddles mounted on a rotatable shaft extending horizontally through the drum. The housing is mounted on a frame which also acts as a mounting platform for a motor connected to he shaft via an appropriate arrangement of gears for driving the shaft at a suitable speed. In practice, since the shaft is usually driven from both ends it extends through a pair of opposed openings formed in the walls of the housing; and, to prevent any dough from leaking through the openings via spaces between the walls and shaft, the spaces are closed with a stationary, fluidtight seal, compressed against the housing and shaft.

Equipment of the type hereinbefore described must be operated under conditions which ensure that the dough being processed is free of agencies injurious to health. Accordingly, the manufacturer constructs his equipment with the forehand knowledge that it must be repeatedly and easily emptied and cleaned to prevent the dough from being contaminated, and the user cleans it periodically with a view to ensuring that the bacteria count of the dough does not exceed certain predetermined levels. If a small deposit of dough is retained in a mixer and develops a sufficiently high bacteria count, it can contaminate a later processed batch of dough.

In the course of operating such mixers, dough is unavoidably forced against the seals and seeps through any space between the seal and housing and/or seal and shaft. To ensure that the seepage does not find its way back into the housing and contaminate later processed batches of dough, the seals are periodically removed so that they, and the cavities in which they are mounted, may be thoroughly cleaned. In the past such cleaning has been conducted on a weekly basis. Recently, with the introduction of ready-to-bake frozen dough products which are particularly susceptible to deterioration due to developing a high bacteria count, industry has been constrained to adopt the practice of removing the mixer seals on a daily basis. However, despite such frequency of cleaning, entire batches of dough have had to be discarded due to their high bacteria count.

To remedy the difficulty I have devised a seal assembly that allows dough which unavoidably finds its way past the seal to freely flow away from the seal. The sealing member of the seal assembly generally comprises: a circularly shaped resilient plastic member, a first circularly extending portion of the surface of the member formed to be abuttably mounted against a rotatable shaft extending through an opening formed in a housing adapted to contain a fluid, a second circularly extending portion of the surface formed to be abuttably mounted against the housing, and a third circularly extending portion of the surface spaced apart from the first and second surface portions and formed at an acute angle with respect to both of them as viewed in a cross section of the member taken in a plane perpendicular to the longitudinally extending axis of the member, the angle between the first and third surface portions being less than the angle between the second and third surface portions so that a force applied to the third surface portion to abut the first and second surface portions respectively against the shaft and housing tends to cause the member to rotate with the shaft.

My invention is the sealing member hereinbefore described and more particularly the sealing member in combination with apparatus comprising means for abuttably mounting the sealing member against the shaft and housing, so as to cause the member to rotate with the shaft, said means being constructed and arranged to allow fluid from within the housing which seeps past the first and second surface portions to freely flow away from the sealing member.

BRIEF DESCRIPTION OF THE DRAWINGS

FIG. 1 is a vertical elevation of an embodiment of the seal assembly, partially in section;

FIG. 2 is an end view of the sealing element of the seal assembly of FIG. 1, taken substantially along the line 2—2 of FIG. 1;

FIG. 3 is a section of the sealing element of FIG. 2, taken substantially along the line 3—3 of FIG. 2;

DESCRIPTION OF THE PREFERRED EMBODIMENT

Figure 4:
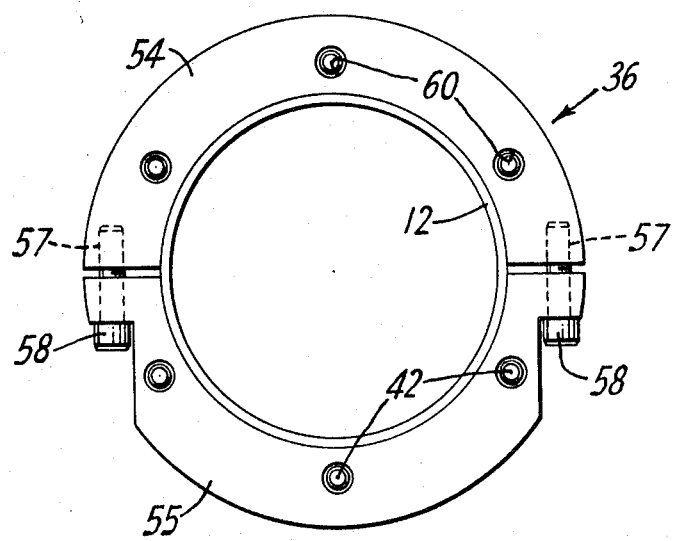
FIG. 4 is an end view of a portion of the seal assembly of FIG. 1, taken substantially along the line 4—4 of FIG. 1.

The preferred seal assembly is shown in the accompanying drawings, wherein like reference numerals designate like or corresponding parts throughout the several views. As shown in FIG. 1, the seal assembly 10 is adapted to be mounted on a shaft 12 which protrudes from an opening 14 formed in a stationary housing 16 within which a mixable fluid such as a mass of the ingredients needed for making predough may be mixed; for example, a mass of flour, water and a leavening agent.

For the purpose of this disclosure, the housing 16 is represented by a fragmented portion of the wall 18 of the mixing bowl of a horizontal dough mixer, such as the mixer described in the introductory portion of this application, and includes the cylindrically shaped bowl insert element 19 which defines the size of the opening 14 through which the shaft 12 protrudes. Also, the area to the left of the wall 18 should be considered to be the interior of the mixing bowl. Thus, the seal assembly 10 is mounted on the portion of the shaft which extends exteriorly of the housing, so that it may be easily dismantled from the shaft for cleaning purposes.

Figure 6:
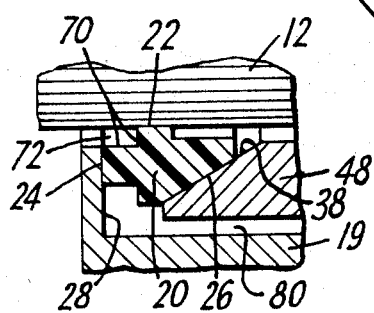

As best shown in FIGS. 2 and 3, the sealing element 20 of the seal assembly 10 is preferably a solid circularly shaped member of irregular surface contour, which is made of a resilient plastic material such as the ultrahigh molecular weight polymer material known in the trade as "TEFLON." In practice, a first portion 22 of the surface of the member is formed to be abuttably mounted against the shaft, a second portion 24 is formed to be abuttably mounted against the wall 18 of the housing 16, and a third portion 26 is formed angularly with respect to the first and second portions 22 and 24 to cause forces applied thereto to be divided for transmission to the first and second surface portions in a particular manner. All three of the aforesaid surface portions extend circularly of the surface of the member. As shown in FIG. 6, wherein a cross section of the member is taken in a plane perpendicular to the longitudinally extending axis of the member, the third surface portion 26 is formed at an acute angle with respect to both the first and second surface portions 22 and 24. However, the angle between surface portions 22 and 26, is less than the angle between surface portions 24 and 26. As a consequence, the component of the applied force which is transmitted radially of the member is greater than the component transmitted coaxially of the member, to the end that the applied force abuts the member against the shaft and housing in a manner which tends to cause the member to rotate with the shaft rather than remain stationary. In the preferred embodiment, surface portion 24 has a radially extending face, surface portion 22 has a cylindrically shaped face formed perpendicular to the radially extending face, and surface portion 26 has a conically shaped face formed at an angle of less than 45° with respect to the cylindrically shaped face.

To promote motion of the sealing element with the shaft, the portion of the surface 28 of the bowl insert element 19 against which sealing element 20 abuts, is preferably coated with a long wearing hard ceramic coating having a negligible coefficient of friction. In addition, the insert element is bolted to the wall of the mixing bowl, by means well known in the art, so that it may be removed for replacement as necessary.

To hold the sealing element in place against the shaft and housing, I provide a spring-loaded sleeve assembly 30 adapted to be carried by the shaft. As shown in FIG. 1, the assembly 30 basically includes a cylindrically shaped sleeve 32 having an inner diameter significantly greater than the outer diameter of the shaft 12, so as to provide an annulus 34 between the sleeve and shaft, and a circularly shaped collar 36 which is cooperatively associated with the sleeve and clampable to the shaft to cause the shaft to rotate the collar and sleeve.

To abut the sleeve against the sealing member, the forward end of the sleeve is preferably provided with a circularly extending conically shaped face 38, inclined at the same angle with respect to the axis of the sleeve as is the conically shaped face 26 of the sealing member. With this arrangement the sleeve carries the sealing element in addition to forcing it into abutment against the shaft and housing. If the surface of the shaft laterally wobbles relative to the housing, within the opening 14 through which the shaft protrudes, the radially extending face 24 of the sealing element will remain in abutment against the surface 28 of the bowl insert element 19 and move radially thereof. The construction thus allows for variations in meeting machining tolerances and allow for misalignment of the shaft and opening.

To cooperatively associate the sleeve 32 with the collar, the rearward end of the sleeve is provided with a plurality of studs at equidistantly spaced intervals along its longitudinal length. In practice, the free end 42 of each of the studs is of larger cross section than the end connected to the sleeve, so as to form a head having a lip 44 against which a split ring washer 45 may bear, when the sleeve is not mounted on the shaft, to coaxially carry a helically coiled compression spring 46 on each of the studs.

Figure 5:
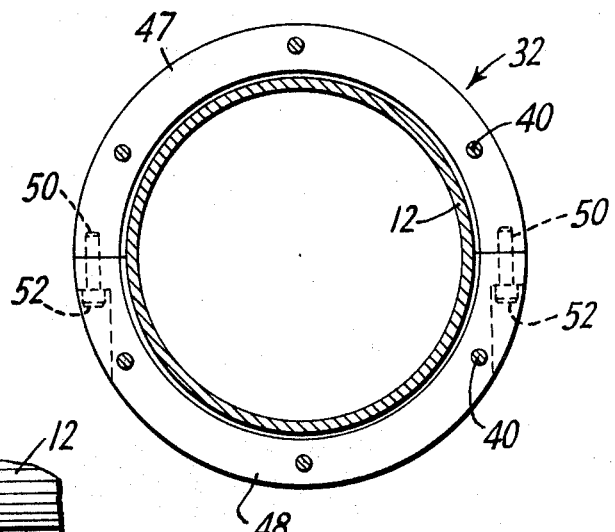
FIG. 5 is an end view of another portion of the seal assembly of FIG. 1 taken substantially along the line 5—5 of FIG. 1.

As shown in FIG. 5, for ease of mounting the sleeve around the shaft, the sleeve includes two semicircular sections 47 and 48, which are bolted to one another after being mounted around the shaft. To that end, section 47 of the sleeve is provided with two pairs of internally threaded recesses 50, one pair of which is shown in FIG. 1, for threadably receiving two pairs of externally threaded bolts 52 carried by section 48 of the sleeve. The collar 36 also includes two semicircular sections, respectively numbered 54 and 55 in FIG. 4. In this case, section 54 of the collar is provided with a pair of internally threaded recesses 57 for threadably receiving a pair of externally threaded bolts 58 carried by section 55 of the sleeve, to bolt the sections together and clamp the collar in place on the shaft.

As shown in FIG. 4, the collar 36 has a plurality of openings 60, extending therethrough at spaced intervals along its longitudinal length, to receive the heads of the studs carried by the sleeve in a manner which allows for the sleeve to move relative to the collar. By making the openings 60 of larger diameter than the outer diameters of the heads to allow for a slight amount of rotational and angular motion of the sleeve with respect to the collar, the sleeve may move angularly and laterally of the axis of the shaft as the shaft rotates. As a consequence, if the axis of the shaft does not remain perfectly horizontally oriented, due to shaft being bent under the weight of the fluid being mixed within the housing, the force exerted on the sealing element by the sleeve will not be appreciably altered since the inclined face 38 of the sleeve will remain in abutment against the inclined face 26 of the sealing element despite the shaft being bent.

Without departing from the spirit and scope of the invention, the studs 40, springs 46 and washers 45, may be carried by the forward end of the collar rather than the rearward end of the sleeve; in which case, a plurality of appropriately sized and spaced opening 60 would be formed in the rearward end of the sleeve, rather than in the forward end of the collar, to accommodate the heads of the studs protruding from the collar. With either arrangement the sleeve assembly 30 would be constructed and arranged such that the sleeve could be spring loaded in place against the sealing element by clamping the collar to the shaft, after compressing a plurality of spring disposed between the sleeve and collar forwardly against the sleeve. In the arrangement shown in FIG. 1, the springs are so compressed. With either arrangement the sealing element is forcibly caused to close the space between the shaft and housing so that fluid from within the housing is unable to freely flow out of the housing via the space.

As shown in FIG. 6, to prevent the sealing element from being extruded into the space between the shaft and housing due to the force applied to it by the sleeve, the circularly extending portion 70 of the surface of the member between faces 22 and 24 is formed to define an annulus 72 of rectangularly shaped lateral cross section next adjacent to the space between the shaft and housing when the sealing element is mounted in place. With this configuration the body of the sealing element is spaced rearwardly of the space between the shaft and housing so as to preclude extrusion of the sealing element into that space.

In addition to the foregoing it should be appreciated that due to the fact that the sleeve is spring loaded, the sealing element is continuously and automatically positioned to compensate for sealing element wear due to abrasion of the element by the shaft and housing. As the sealing faces 22 and 24 become worn due to such abrasion, the compression springs expand to force the sealing element against the shaft and housing. To allow the sleeve to reduce the inner diameter of the sealing element as it becomes enlarged due to wear, the element is laterally split at an angle of 45° with respect to the longitudinally extending axis of the member as shown in FIGS. 2 and 3. The laterally extending faces 75 and 76 of the member, formed by splitting the same, are slidably abuttable with one another to allow them to slide relative to one another as the shaft sealing face 22 is worn. Accordingly, the seal assembly may be said to include means for automatically compensating for in-service wear of the sealing faces of the sealing element.

It is a feature of the invention to space face 26 of the sealing element apart from its first and second faces, 22 and 24, and incline face 26 at the angle hereinbefore described to allow the sealing element to be mounted in place against the shaft and housing without being completely enclosed in a cavity, a cavity in which seepage fluid from within the housing can accumulate. For example, in the arrangement shown in FIG. 1, any fluid from within the housing which passes face 24 can freely flow away from the sealing element without being obstructed by the sleeve. The sleeve need not be formed to enclose the sealing element for the purpose of forcing it against the shaft and housing, since the sealing element is formed to be otherwise forced in place. Likewise, any fluid which passes face 22 of the sealing element can also freely flow away from the sealing element without being obstructed by the sleeve.

Accordingly, it is believed that the surface contour of the sealing element is uniquely adapted to allow the element to be held in place by means of apparatus which is constructed and arranged for allowing fluid which seeps past the shaft and housing sealing faces, 22 and 24, to freely flow away from the element. Sleeve assembly 30 is a preferred form of apparatus so constructed and arranged. The annulus numbered 80 in FIG. 6, is a passageway formed by the bowl insert element 19, sealing element 20 and sleeve 32 through which fluid from the housing which seeps past the housing seal face 24 may freely flow away from the housing. In addition the annulus numbered 34 in FIG. 1, is a passageway formed by the shaft 12 and sleeve 32 through which fluid form the housing which seeps past the shaft seal face 22 may freely flow away from the housing. In the latter case it should be noted that fluid which flows through annulus 34 may freely flow around the rearward end of the sleeve via the space between the sleeve and collar since they are spaced apart from one another by the compression springs. Accordingly the space between the rearward end of the sleeve and collar may be considered to be a part or extension of the passageway 34.

Of course, it should be noted that since the sealing element is a laterally split resilient member, and the sleeve and collar are each constructed from two semicircular sections, the seal assembly may be mounted in place on the shaft without disassociating the drive means from that end of the shaft, i.e., the assembly may be mounted laterally, rather than endwise, on the shaft.

What is claimed:

1. A sealing member comprising a circularly shaped resilient plastic member, a first circularly extending portion of the surface of the member formed to be abuttably mounted against a rotatable shaft extending through an opening formed in a housing adapted to contain a fluid, a second circularly extending portion of the surface formed to be abuttably mounted against the housing, and a third circularly extending portion of the surface spaced apart from the first and second surface portions and formed at an acute angle with respect to both of them, the angle between the first and third surface portions being less than the angle between the second and third surface portions so that a force applied to the third surface portion to abut the first and second surface portions respectively against the shaft and housing tends to cause the member to rotate with the shaft.

2. The sealing member according to claim 1 wherein the second surface portion is a radially extending housing seal, the first surface portion is a cylindrically shaped shaft seal formed perpendicular to the housing seal, and the third surface portion is a conically shaped face formed at an angle with respect to the shaft seal of less than 45°.

3. The sealing member according to claim 2 including first and second laterally extending faces slidably abuttable against one another.

4. The sealing member according to claim 3 in combination with apparatus comprising means for abuttably mounting the shaft and housing seals respectively against the shaft and housing so as to cause the member to rotate with the shaft, the mounting means being constructed and arranged to allow fluid from within the housing which seeps past the housing seal to freely flow away from the sealing member.

5. The combination according to claim 4 wherein the mounting means includes sleeve means having a circularly extending conically shaped face formed to be abuttably mounted against the conically shaped face of the sealing member, and the sleeve means has an inner diameter larger than the outer diameter of the shaft so as to provide an annulus between the sleeve means and shaft through which fluid from within the housing which seeps past the shaft seal may freely flow away from the sealing member.

6. The combination according to claim 5 wherein the mounting means includes spring means for spring loading the conically shaped face of the sleeve means abuttably against the conically shaped face of the sealing member.

7. The combination according to claim 6 wherein the mounting means includes collar means clampable to the shaft for rotation with the shaft, the collar means associatable with the spring means for spring loading the sleeve means against the sealing member, and the collar means associable with the sleeve means for rotating the sleeve means.

8. The combination according to claim 7 wherein the collar means is spaced apart from the sleeve means by the spring means so as to form a passageway between the sleeve means and collar means, and the passageway is in communication with the annulus so that fluid which flows through the annulus may freely flow away from the sleeve means and collar means via the passageway.

* * * * *